(12) United States Patent
Samid

(10) Patent No.: US 10,956,878 B2
(45) Date of Patent: Mar. 23, 2021

(54) MINTING AND USE OF DIGITAL MONEY

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 475 days.

(21) Appl. No.: 15/582,784

(22) Filed: May 1, 2017

(65) Prior Publication Data

US 2017/0249607 A1  Aug. 31, 2017

Related U.S. Application Data

(63) Continuation-in-part of application No. 15/337,203, filed on Oct. 28, 2016, now abandoned, which is a continuation of application No. 14/737,924, filed on Jun. 12, 2015, now abandoned, and a continuation of application No. 14/352,994, filed as application No. PCT/US2012/061331 on Oct. 22, 2012, now abandoned, and a continuation of application No. 13/529,399, filed on Jun. 21, 2012, now abandoned, which is a continuation of application No. 12/081,412, filed on Apr. 15, 2008, now Pat. No. 8,229,859.

(60) Provisional application No. 61/688,788, filed on May 22, 2012, provisional application No. 61/627,977, filed on Oct. 22, 2011, provisional application No.
(Continued)

(51) Int. Cl.
*G06Q 20/06* (2012.01)
*G06Q 30/06* (2012.01)
*G06Q 20/38* (2012.01)
*G06Q 20/36* (2012.01)

(52) U.S. Cl.
CPC ....... *G06Q 20/0655* (2013.01); *G06Q 20/065* (2013.01); *G06Q 20/3678* (2013.01); *G06Q 20/382* (2013.01); *G06Q 30/06* (2013.01)

(58) Field of Classification Search
CPC ............. G06Q 20/065; G06Q 20/3678; G06Q 20/382; G06Q 30/06
USPC .......................................................... 705/69
See application file for complete search history.

(56) References Cited

U.S. PATENT DOCUMENTS

| | | | | |
|---|---|---|---|---|
| 7,841,538 B2 * | 11/2010 | Robertson | ........ | G06K 19/07733 235/492 |
| 2002/0162885 A1 * | 11/2002 | Himmel | ............. | G06Q 20/3433 235/380 |

(Continued)

OTHER PUBLICATIONS

Mandana Jahanian Farsi, Digital Cash, 1997 (Year: 1997).*

*Primary Examiner* — Jacob C. Coppola
*Assistant Examiner* — Timothy Paul Sax

(57) ABSTRACT

Systems and methods are provided for constructing a digital money from concatenated or otherwise linked bit strings. Several applications of digital coins include (i) means to secure the use of money according to the prevailing understanding between payer and payee, (ii) a method by which a mint entity that mints and redeems digital money collaborates with traders to jointly earn interest, or jointly gamble in the stock market, or other markets, (iii) a method by which a mint entity that mints and redeems digital money collaborates with merchants, their customers, and credit-extending entities (CEE) to allow the CEE to extend credit to selected group of customers, so that these customers can shop with any participating merchant, and (iv) a method for utility consumption on a real-time basis by splitting digital coins at a rate that pays exactly for the utility measure being consumed.

4 Claims, 3 Drawing Sheets

Related U.S. Application Data

60/960,672, filed on Oct. 9, 2007, provisional application No. 60/907,869, filed on Apr. 19, 2007.

(56) References Cited

U.S. PATENT DOCUMENTS

| | | | | |
|---|---|---|---|---|
| 2004/0212966 | A1* | 10/2004 | Fisher | G06K 19/07732 361/726 |
| 2005/0023238 | A1* | 2/2005 | Wong | B65D 55/16 215/252 |
| 2007/0153460 | A1* | 7/2007 | Chen | G06F 1/181 361/679.09 |
| 2008/0082714 | A1* | 4/2008 | Hinchey | G06F 13/4045 710/300 |
| 2012/0173432 | A1* | 7/2012 | Yeager | G06Q 20/367 705/65 |
| 2014/0279551 | A1* | 9/2014 | Samid | G06Q 20/065 705/64 |
| 2015/0278672 | A1* | 10/2015 | Andre | G06K 19/07737 235/492 |
| 2015/0310426 | A1* | 10/2015 | Samid | G06Q 20/04 705/69 |

* cited by examiner

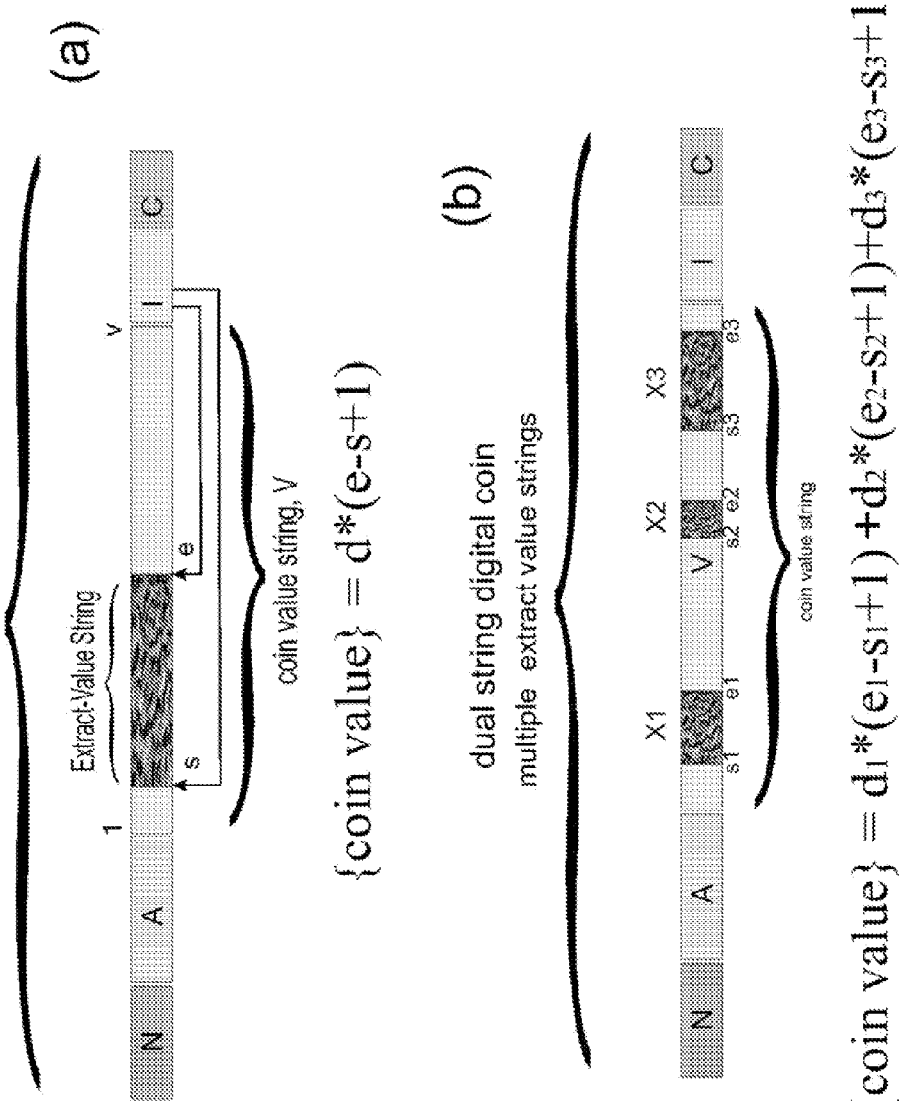

MINTING AND USE OF DIGITAL MONEY

CROSS-REFERENCE TO RELATED APPLICATIONS

This application is a continuation of U.S. patent application Ser. No. 14/352,994, filed on Apr. 18, 2014 as national stage application of PCT/US2012/061331, filed on Oct. 22, 2012, which claims the benefit of U.S. Provisional Patent Application Ser. No. 61/627,977, filed Oct. 22, 2011 and U.S. Provisional Patent Application No. 61/688,788, filed May 22, 2012; this application is also a continuation-in-part of U.S. patent application Ser. No. 15/337,203, filed Oct. 28, 2016, which is a continuation of U.S. patent application Ser. No. 14/737,924, filed Jun. 12, 2015, which is a continuation of U.S. patent application Ser. No. 13/529,399, filed Jun. 21, 2012, which is a continuation of U.S. patent application Ser. No. 12/081,412, filed Apr. 15, 2008, now U.S. Pat. No. 8,229,859, which claims the benefit of U.S. Provisional Patent Application Ser. No. 60/960,672, filed Oct. 9, 2007 and U.S. Provisional Patent Application No. 60/907,869, filed Apr. 19, 2007, all of which are incorporated by reference in their entireties.

INTRODUCTION

Digital money is embodied in the form of ordered bits, namely a string of binary digits. The string itself expresses the transactional value that makes this string into 'money', or money equivalent. The string—the bit sequence of ones and zeros—per se carries the value, without regard to the particular media in which the bits are written. Being media-unattached is the characteristics of digital money. Several methods have been proposed for creating digital money. The invention described herein describes a method for minting digital money and various use-cases which relate to digital money regardless of the method used in expressing the bit string—the transactional value string. In order to make the best use of this new abstract form of money it is necessary to develop practical, secure and robust applications in the following categories: (i) Anonymity and Security Management, (ii) The Customer Loyalty, and Reward Points market, (iii) Continuous Payment, and (iv) Virtual Banking, Investment and Risk Management, (v) Global Money Transfer, and (vi) Small and Physical Cash Transfer, and (vii) Government Support Services. The challenge to develop fitting applications for the above specified use categories, is the very challenge addressed by this application.

One application regards the credit market in which a lender (a credit extender) extends credit to a borrower (a credit consumer) prior to the borrower use of this credit, and in such way that interest on the credit (the loan) accrues not from the moment the credit is extended, but from the moment the credit is actually used, and exercised by the borrower. Unlike regular loans, such credit-on-demand, has been the prerogative of banks, mainly through the global credit networks, like Visa and Master Card, which are universally accepted. The same service can be offered by non-banks using the invention described herein. A second application regarding interest bearing accounts, which can be used while, at the same time, working with the money that earns the interest. A third application regards betting on risky assets, which may rise or fall in value.

DESCRIPTION OF THE INVENTION

While the present teachings of this invention are described in conjunction with various embodiments, it is not intended that the present teachings be limited to such embodiments. On the contrary, the present teachings of this invention encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

BRIEF DESCRIPTION OF THE DRAWINGS

The skilled artisan will understand that the drawings, described below, are for illustration purposes only. The drawings are not intended to limit the scope of the present teachings in any way.

FIG. 3 depicts the structure of Dual String Option digital coin, in accordance with various embodiments.

DETAILED DESCRIPTION OF THE INVENTION

Computer-Implemented System

Figure 1:
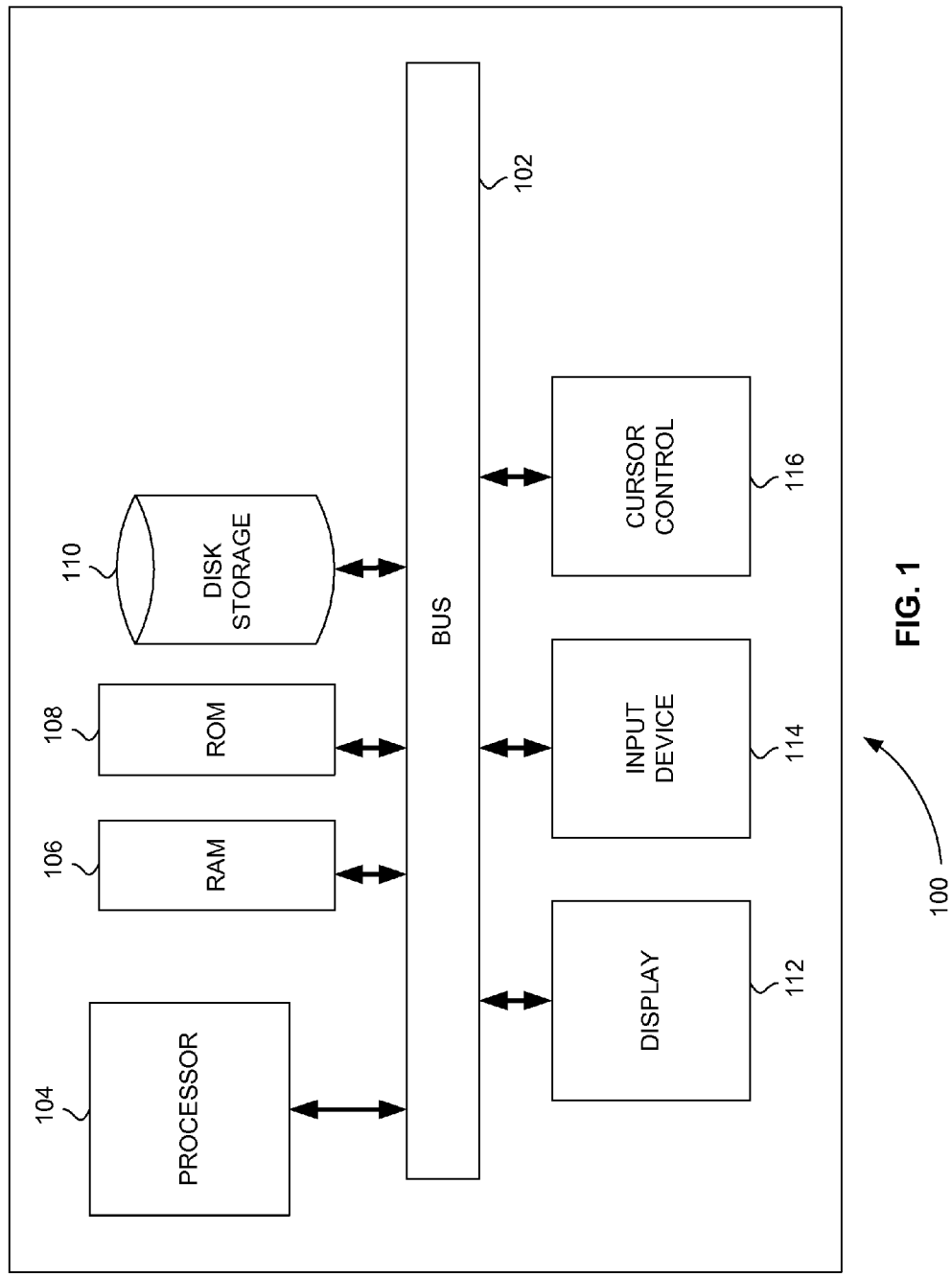
FIG. 1 is a block diagram that illustrates a computer system, upon which embodiments of the present teachings may be implemented.

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Systems and Methods of Data Processing

Before one or more embodiments of the invention are described in detail, one skilled in the art will appreciate that the invention is not limited in its application to the details of construction, the arrangements of components, and the arrangement of steps set forth in the following detailed description. The invention is capable of other embodiments and of being practiced or being carried out in various ways. Also, it is to be understood that the phraseology and terminology used herein is for the purpose of description and should not be regarded as limiting.

Use Environment for Digital Money

The Payment Environment:

We define an environment comprised of a mint—an entity that issues, mints, digital money, and of traders—individuals or organizations who trade with the minted money. The mint will also serve as a coin redeeming authority, (CRA). The minted digital money will be interchangeably referred to as digital coins, or digital bills, or digital money, or simply coins and bills.

Lifecycle of a Coin:

A digital coin is born, created when the mint mints, constructs it. It is then passed to a trader, who may pass it to another trader. The coin will pass between traders until one trader redeems it—namely, returns it to the mint against its value in some other expression.

Meta-Data:

We offer a design in which the bit string that represents the transactional value, namely: the value string, is associated (linked, connected, or concatenated) with another string that represents meta data. That meta-data is comprised of (1) identification parameters, (2) terms of payment parameters, (3) security parameters, and (4) special case parameters. The essence of this invention is the idea that the distinct and advantageous use of digital money is based on setting the meta data to support a variety of applications. In many cases this inherent link between the value part of the coin (the value string), and the meta-data part of the coin, enables applications which are not so conveniently, or not at all possible with more traditional forms of money. We shall use the names: Alice, Bob, Carla, David, etc. to describe nominal traders using the digital money, and use the name Eve to designate an eavesdropper, and Harry to designate a "hacker"—a person aiming to violate the good order of digital transactions. The general payment dynamics is as follows: Alice is getting a digital coin from the mint, usually against payment in another form of money, but in certain circumstances against a promise to pay, or by some other arrangement. Alice passes the coin or part of it to Bob for some consideration, Bob passes to Carla, Carla to David, etc., and David redeems the coin at the mint, usually against a corresponding amount of money paid in some form, but also against other considerations.

Tethered Money:

Digital coins linked with meta-data that includes terms of payment, which in turn infringe upon the universality of nominal money will be referred to as tethered money. The use of tethered money will insure that digital money is spent in accordance with the terms agreed between payer and payee, the method comprising a linkage between the bit-string that represents the value of the money (value string), and the corresponding bit string that represents meta-data for the value string, the meta-data being comprised of (i) identification parameters, including identification of the person or entity, or group of people that have the exclusive right to redeem the coin. (ii) terms of payment parameters, including, but not limited to expiration date, redemption validity date, product or service, specific or type that must be purchased by that coin, and any other logical term. (iii) Security parameters.

The property of being tethered implies that the money referred to by the terms of payment cannot be used as freely as regular money, but rather in a more limited way, as specified by the terms of payments. Other tradable forms of money cannot be intrinsically tethered to use purpose. Digital money where the value string can be inherently linked to terms of payment allows the link to be permanently recorded in a mint database, and allows for standard cryptographic means to safeguard the tethering. Tethered money is applicable in any case where the transacted money is not transferred against a full and equivalent present value in return. In any case where the money flows against a promise or intent to use it in a certain way, even if this intent is specified in a valid contract—it is possible to recruit cryptography to tether the money to the declared purpose articulated by the payer so that by its very minting its use will be restricted. Tethered money applies to charity, unemployment pay, student loan, and international help to the needy. It may also be used to implement modern version of travelers' checks: money tethered to a declared owner, who is the only person who can redeem that coin. The mint will satisfy itself that it talks to the right person, using standard cryptographic tools.

For example, the terms of payment will specify a named entity, (individual or organization), identified by unique attributes, such that only that named entity will be allowed to redeem the digital money (to be paid in nominal currency for its face value), and such that all others will denied the option to redeem the digital coin, Anonymity and Security Management:

The meta data may be used to limit coin redemption rights to traders that belong to a group, set. This allows for partial anonymity: the mint knows that the redeemer belongs to the designated group, but does not know the specific identity of the redeemer. Players: (i) the mint, (ii) Alice—a trader requesting a group-privileged coin from the mint, (iii) Bob, a trader submitting a group-privileged coin for redemption, (iv) the group administrator. Issuance Procedure: (a) Alice submits a group-id, (A), requests the mint to issue her a group-privileged coin; (b) the mint returns a random number, (R); (c) Alice provides A and R, (A+R), to the group administrator to sign with an agreed upon private key: $S_a=(A+R)_{signed}$. (d) Alice passes S to the mint, (e) the mint verifies the identity of A+R by decrypting $S_a$ with the public key of the group administrator, and then issues the group-privileged coin to Alice. The meta-data on the coin designates it as group-privileged coin. The group privileged coin may be a discounted coin, where the group pays the difference, or it may be a 'free coin' where the group has a backdoor arrangement with the mint to pay for the group-privileged issued coin. Redemption Procedure: (f) Bob submits to the mint a group privileged coin along with his group-id, B (g) the mint return a random number, R; (h) Bob submits (B+R) to the group administrator, (i) the group administrator signs (B+R) with its private key: $S_b=(B+R)_{signed}$, (j) Bob submits Sb to the mint, (k) the mint verifies (B+R) by decrypting $S_b$ with the group public key, (1) the mint then redeems the coin to Bob. In other words, the mint in its capacity as the coin redeeming authority, when facing a member of the group specified in the meta data as allowed to redeem the digital coin, (coin claimant) who identifies itself by name, 'name', to the coin redeeming authority (CRA), then it returns a random number, 'random' to the coin-claimant, which the claimant submits along with his name to an administrative authority of the group named in the meta-data of the coin, and which said administrative authority signs with its private key, producing a signed signature of 'name'+'random', such that the coin claimant then submits the signed 'name' plus 'random' to the CRA, which the CRA then decrypts with the public key of the group administrative authority in order to authenticate the coin claimant as a bona fide member of the group specified in the meta data of the digital coin, and so concluding, the CRA redeems the coin in favor of the coin claimant.

Customer Loyalty and Inducement Procedures:

These are procedures whereby a party which is interested in influencing the behavior of others would do so by offering others the benefit of redeemable digital money. Usually it is a merchant who will offer customers or prospective customers, some digital coins that are associated with some limiting redemption options. (Ahead whenever the term 'customers' is used, it would include also 'prospective customers). These limitations will guide the customer or prospective customer to behave in a way advantageous to the merchant. These limitations will be specified in the meta-data, and will limit the redemption of the coin. The redemption limitation data is expressed in the meta-data such that the mint's computer can faithfully interpret this limitation data. In general the mint computer will read meta-data parameters, refer to pointed-to data elsewhere and to algorithms stored elsewhere, and then compute a decision whether the redemption should be approved or not. Common limitation may be (i) validity period—before which and after which the coin cannot be redeemed, (ii) what the redeemer sold against the coin submitted for redemption, and (iii) the identity, or group-identity of the redeemer. The meta-data could be written by the mint, or by the merchant that initiates the loyalty program. The mint in this case is also called 'the core mint', and the merchant, if he modifies the meta-data, is also referred to as 'front mint' or 'foremint.' The merchant will design and set up the terms under which his customers, or prospective customers will receive the restricted money (loyalty money). It may be in lieu of discount from a listed price, or it may be in the form of a discount coupon used to lure customers, it may be restricted to the merchant's store, or it may be restricted to several stores who form a coalition coupon. The merchant who orders the loyalty money may (i) pay for them to the mint up front, or, (ii) he may pay for them when they are redeemed at another store with which the merchant forms a coalition discount, or (iii) the merchant may not pay for the digital coin at all, except a certain service fee. Option (i) above works with the loyalty coins treated as normal money. The merchant pays for them to the mint up front, and when the customers hand them over to the merchant according to the terms of redemption, the merchant presents the coin to the mint to verify validity and the mint pays the merchant back (minus some service commission). The arrangement between the mint and the merchant may be that the merchant pays only a portion of the nominal value of the coin, and he gets back the same portion upon submitting it for redemption. This is useful for a coalition setup in which several merchants band together to offer loyalty coins that are good with each of the coalition merchants. Option (ii) above refers to a coalition setup. A merchant will distribute loyalty money, for which he pays the nominal value or less, so that if his customer redeems the loyalty money with another merchant of the coalition then the merchant pays the mint, and the mint pays the coalition merchant. The third option above, (iii): The merchant will order from the core mint a certain number of loyalty coins totaling $X. The merchant is not paying the $X to the mint, but the mint will not redeem the coins either. Those coins will be distributed by the merchants to his customers or prospective customers under the merchant's terms, and when the customers bring them back to the merchant to pay with them, then the merchant passes these coins to the mint. The mint verifies that the submitted coins were in fact minted by it, and were never redeemed, and conveys this verification to the merchant, who then accepts these coins as money. As indicated the mint does get paid and does not pay for these coins, they are therefore called "dummy coins". The mint charges a service fee from the merchant. The merchant is paying for coin management: insuring that customers don't use a loyalty coin twice, or don't mint loyalty money themselves. Dummy coins have the advantage that a merchant can issue an abundance of them, and if only a fraction of them is used, it's OK, no money loss.

Continuous Payment:

Continuous payment is payment that happens continuously with the passage of time, paying, say US$0.1/second, or payment that happens for every occurrence of a chain of events. Some formations of digital money do not lend themselves towards continuous payment, but others do. Two important categories for continuous payments are: (a) online services, and (b) embedded services. In an online service a user may hook a digital money-loaded USB stick to his machine, and dedicated software will adjust the value string of the coin to reflect the diminishing value of the coin over time, or over cost-counting events. This continuous mode may be used for paying for media per time of reading/viewing/listening, pay per advice and counseling, pay per maintenance and support. Embedded application happens when a digital money loaded device is hooked into a car, or a meter of some kind, where the value string adjusts itself according to time past (say in parking), or per cost-marking events. The paid for service may be unique (like a personal legal advice), or it may be public, or broadcasted, like a movie, or a library. The paid rate may be flat, or it may be governed by a complex algorithm, and contingent upon the balance between supply and demand. The advantage of this 'pay as you go' mode is that it works for micropayments, and that it voids the need for after-service invoicing, and bill collection. Traveling teachers or experts will use a device, which may be a small computer, or a phone, into which they will stick their customer's digital money stick, or device (USB or otherwise), and while they are teaching the money will flow from the stick to the device. At the end of the lesson the USB stick is disengaged, and the digital money correspondent to the payment shows up as a digital coin in the teacher's, or service provider computer. Continuous payment may be used to fine tune car insurance premium. Today's automobiles are so computerized that they anyway accumulate driving data in real-time mode. That data can feed an algorithm that would determine payment to be siphoned away from a USB stick, and sent as payment to the insurance company. Safe drivers who drive in non-accidents prone neighborhoods, and drive less will pay less.

Banking Services:

Digital money may change the paradigm of banking in the following sense: today banks serve several functions: (1) they sell credit, (2) they sell interest, (3) they sell money custody and security services, (4) they facilitate money movements, and (4) they originate virtual currency in the form of banknotes and other tradable instruments. Digital money is minted by the mint (taking care of function (4) above, and the money is safely stored by its owner, since digital money is bit-stored, subject to encryption, and may be cryptographically fused with terms of payments that insure that only the registered owner of each coin can redeem it. So a thief will not benefit from stealing it. Encryption between payer and payee will also insure that the transfer of money is secure. This takes care of functions (2) and (3) that banks fulfill today. This leaves banks with only the functions of selling credit and selling interest. Albeit, stripped off the other functions of today's banking, they will stand in competition with a large variety of entities that will also offer credit and interest for sale. Digital money invites partnership between the mint and its traders. Together they can exercise all the functions of the bank except the selling of credit and the selling of interest. Minting the equivalent of banknotes will be accomplished by the mint, storing and moving the money around will be responsibility of the trader. So the mint and a trader will be able to (1) deposit the money in and move it under the custody of the trader. The mint and the trader will decide to buy a certain stock in the stock market, nominal value: $x. Alice will pay the mint, the mint in turn will buy the stock, and issue digital coin to Alice. At some future point Alice may wish to redeem the coin. The mint at that moment will sell the stock it bought when it issued the digital coin to Alice. If the price of the stock remained constant, then the mint pays Alice the sum of $x, minus a certain service commission. If selling the amount of stock bought at the time of minting the coin increases by $\Delta x$, then Alice will be paid $x, and the added sum, $\Delta x$, will be divided between Alice and the mint, according to their agreement upon purchase of the stock. They may divide the added dollars half-half, and in the case Alice will be paid in total $x+0.5\Delta x$ dollars. Similarly, if the price of the stock plunges by $-\Delta x$, then Alice and the mint bear the loss in pre-agreed proportion. This is an example how Alice and the mint cooperate to manage risk. In a very similar way they can cooperate to buy interest. Alice will pay $x to the mint, and receive in return a digital coin valued at $x (minus some service commission). The mint will deposit the $x in an interest bearing account in some bank, or buy some bond market instruments. When Alice submits the digital coin for redemption, the Mint pulls out the invested dollars, and now holds the original $x plus the accumulated interest: $\Delta x$. The mint will divide the accumulated interest between it and Alice as pre-agreed. If Alice and the mint decide to invest in a risky account which suffers loss, they share that loss as pre-agreed. This Alice-mint collaboration will readily extend to purchase of any valuable: real-estate, diamonds, mutual funds, etc. In all these arrangements Alice handles only digital money, the mint uses the banks and the commodity markets to deal with the physical assets. The banks will remain the place to go to for interest bearing accounts, etc., but the mint will deal with the banks on a wholesale basis, which is much more efficient than when the banks deal with individual traders. Another fundamental advantage to this trader-mint paradigm is that Alice can use the minted digital money while the money accumulates interest, or was spent on buying stocks. If Alice pays such a coin to Bob, and Bob does not redeem it, then the mint is indifferent to this transaction because the interest continues to accumulate, and also the price of the stock or the valuable oscillates as it does. Alice and Bob may agree to subsequently share the accumulated interest or the appreciated stock (and also share the losses, if any). This leads to the notion of banking coalition in which Alice, Bob, Carla, David and any others will use such, say, interest bearing coins only within the group for their back and forth payments, making sure they don't redeem these coins. The coalition members will have an agreement how to share the profits and loss, and they will achieve what is not achievable in today's banking: they will use money (inter-payments) while depositing the money to let the money work for them. The coalition members may choose to build a coalition-internal mint where its coins are purchased with coins used for investment as described above.

In other words, this here is a method by which a mint entity that mints and redeems digital money collaborates with traders to jointly earn interest, or jointly gamble in the stock market, or other markets, by having the trader pay the mint the investment sum, and the mint, counters by issuing the trader a digital coin for the face value of his investment, and the mint also, right away, deposits the trader's money in an interest bearing account, or the mint is purchasing certain valuables in a stock market or another appropriate market, and such that any profit or loss from the investment is shared between the mint and the trader in pre-agreed proportion, and also such that all the time between minting the coin in favor of the trader, and the time of redemption of said coin, the trader may use the digital coin, as if it were ready money, pay an obligation with it, or purchase goods and services, such that the recipient of the coin, and anyone to whom the coin is paid subsequently, also does not request the mint to redeem the coin.

Payment on Demand (POD) Digital Coins:

The mint will operate without financial risk if it is paid for its coins before it redeems them. In a normal way the mint will be paid upon minting and delivering the coin, but it can also be paid shortly before the coin is submitted for redemption by it. Such arrangement will be regarded as payment-on-demand (POD). Alice will buy $x in POD coins. The terms of payment for these coins will indicate the POD status, and will refer to Alice as the one to pay for them. Having been issued these coins, Alice might use them to pay Bob, who might pay them to Carla, and so on. At one point, say, David submits that coin for redemption at the mint. The mint keeps the case "on hold" while it turns to Alice asking for payment for the coin submitted for redemption by David. If Alice refuses or is unable, then the mint denies David's request. If Alice does pay the $x to the mint, then the mint will pay the same $x to David (applying some pre agreed service fee). Alice benefits from this arrangement since she needs to come up with the money much later than normally. The POD scheme has another intrinsic advantage: POD coins can be spread around, may be lost, or stolen—they are worthless until paid. This attribute can be used for loyalty money. A merchant might send emails with POD digital coins as attachments. The emails go to many prospective customers, but only a fraction of them uses the emails to buy anything from the merchant. Since the coins are POD, the merchant is not losing the unused money, and only honors the POD coins that come back to his store, or to a member of the loyalty coalition. As indicated above, if the POD comes to the merchant store, the money cycle is mute because the merchant submits the digital coin for redemption, and he is the one responsible for the POD pre-payment.

Selling Credit:

Alice may wish to sell credit to Bob. She will order POD coins from the mint, nominal value $x, and will pass on these coins to Bob. Bob at some later point in time may wish to buy merchandize for $y≤$x. Bob will remit to the merchant, the POD coins he got from Alice. The merchant will submit the coins to the mint to validate them. The mint will recognize that these coins have not been paid for, they are POD, and will recognize that Alice ordered them, so the mint will turn to Alice, requesting payment. Alice will have to use some cryptographic protocol to satisfy herself that it is Bob who submitted these coins for redemption, and then she would pay the mint the nominal value of the coin submitted by Bob, namely $y. Once the mint is paid by Alice, the mint will validate the coins to the merchant, or simply pay to his account, either with mint money or otherwise. By so doing the mint concluded its involvement with the transaction. It will be left for Alice to chase Bob to pay back the credit. It is noteworthy that Alice does not have to be a bank, she can be an individual or an organization. Her advantage may be that she knows Bob, or that she has good collateral on his debt. This arrangement achieves functional decoupling between Alice that sells the credit to Bob, and between the mint and its universal recognition by the merchant that allows a merchant who does not know Bob and does not know Alice to sell on credit to them both, while he, the merchant, remains in the cash equivalent business.

In other words, this is a method by which a mint entity that mints and redeems digital money collaborates with merchants, their customers, and credit-extending entities (CEE) to allow the CEE to extend credit to selected group of customers, so that these customers can shop with any participating merchant. The method comprising the minting of unpaid digital coins marked in their terms-of-payment as 'paid on demand' (POD), and the mint conveying said POD marked coins to a CEE, which in turn conveys said coins, per its risk assessment, to some selected credit-purchasers (individuals or organizations) such that the credit purchasers may use said coins with any participating merchant of their choice, and said merchant submits the POD-marked coins to the mint for redemption, and such that the mint, in turn, requests the CEE to pay the mint the nominal value of the digital coins submitted for redemption, and such that if the CEE pays the mint, the mint, in turn, pays the participating merchant, which, in turn, releases the goods or services to the credit-purchasing customer, and thereby concludes the credit based transaction, except that the CEE and the credit-purchasing customer still have to settle the credit-purchase between them.

Figure 2:
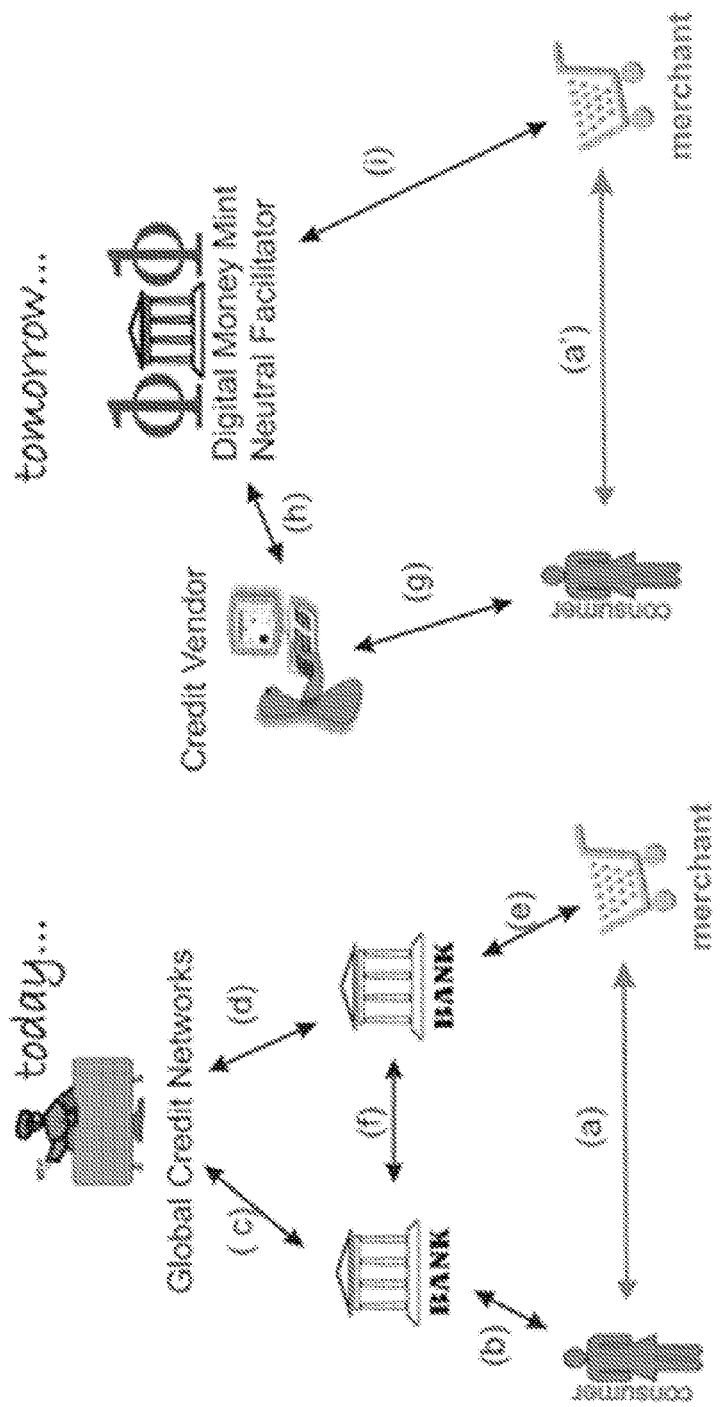
FIG. 2 depicts the consumer credit, today and tomorrow, in accordance with various embodiments.

The invented modality for credit based transactions is depicted in FIG. 2: Consumer Credit: Today and Tomorrow. FIG. 2 is explained in detail below:

The figure depicts on the left side the mechanism of consumer credit transactions, as it is being conducted today. A consumer is connecting with a banking establishment (marked by line (b)), and receives from the bank an assessment of his or her credit-worthiness. According to this assessment the bank exploits its membership in a banks-owned global credit network (this connection is marked by line (c). By force of its membership in the global credit network, the bank issues a credit card to the consumer, marked with the brand name of the global credit network (this issuance flows along line (b)). The consumer then identifies some merchandise offered by the merchant (this identification is designated by line (a)). Instead of paying cash, the consumer submits to the merchant his or her credit card (along line (a)). The merchant, in turn submits this credit request to its bank (along line (e). The merchant's bank passes the request to the Global Credit Network (along line (d)), and to the consumer's bank (along line (f)). The consumer's bank is the entity that assumed the risk of providing credit to the consumer, and it is its decision whether to approve this credit request. If approved then the consumer's bank so notifies the merchant's bank (along line (f)), and the merchant's bank communicates this approval to the merchant (along line (e)). Following the approval the merchant releases the merchandise to the consumer, (along line (a)), and sends the record of the transaction to its bank (along line (e)). The merchant's bank requests payment from the customer bank (along line (f)). The consumer bank pays the merchant's bank (along line (f)), and the merchant's bank deposits the payment in the merchant's account.

The figure depict on the right side the mechanism of consumer credit transactions, as it is envisioned on account of this invention. One main difference is that the credit vendor will not necessarily be a banking institution, but any entity so disposed. (The term "credit vendor" here and the term "credit extending entity", CEE elsewhere, refer to the same concept.) For example, an employer of a consumer is in a good position to offer credit. The credit vendor will approach the digital mint along line (h), and request it to issue him digital money marked as unpaid, or 'paid on demand' (POD) money. That money is stored by the credit vendor on his computer (not in a bank). The credit vendor will then enter into a credit agreement with the consumer (along line (g)), and provide him or her with digital money marked POD. These digital coins are taken from the coins issued to the vendor by the digital mint. The consumer then attempts to buy some merchandise from the merchant, and pays for it with some or all of the POD-marked digital coins provided to him by the credit vendor (this attempt is marked along line (a')). The merchant, in turn, submits the digital coins to the digital mint, asking to redeem them (long line (i)). The digital mint then requests said payment from the credit vendor (along line (h)). The credit vendor will exercise whatever validation procedure to satisfy itself that the credit is being requested by the consumer and not by a fraudster, and when so satisfied, the credit vendor will pay the digital mint the requested sum (along line (h)), and the digital mint, in turn, will pay the merchant for the digital coin presented to it (along line (i)). The payment may be in a form of freshly mint digital coin, or in an earlier non-digital form.

Fiduciary Coins:

Digital coins may be tethered to logical conditions that may reflect the agreement between payer and payee as to the disposition of the money. Today Alice may transfer $x to Bob under an agreement by which Bob commits himself to certain limitations and certain activities with respect to the money. If Bob falls short of his commitment Alice may call Bob to account, but her only recourse, in case of a dispute is a court of law. With digital money the terms of the payment agreement may be expressed as terms of payment in the meta-data of the coin, so that Bob will not be able to use the money outside the agreed upon terms. This would give Alice confidence that Bob will abide by the agreement, and will spare her the need to meet Bob in an expensive court battle. Such confidence will encourage Alice to enter into promissory transactions that overall boost the economy. Alice may be a bank, and Bob may be borrowing money for home improvement. In that case the digital money will only be redeemable by a bona fide home improvement contractor. Alice may be a rich country lending money to a poor country, making sure the money goes into agreed upon economic development actions. Fiduciary money can be used in insurance. The premium payers will limit their money to be used in low risk investment so that the insurance company will have resources to pay off if called for. This will alleviate the burden of government insurance inspectors.

Saving Incentive Fiduciary Coins:

Tethered digital money can be used to encourage savings. If Bob has some degree of freedom in managing expenses then Alice could motivate him by providing an estimated amount of $x in fiduciary coins, tethered to the anticipated expenses, and by the end of the spending period agree with Bob that the difference between the amount he actually spent $y and the higher sum $x, will be divided between Alice and Bob. Bob's share will be expressed by removing the tethering on his share, so he can use it as he sees fit. In this scheme Alice could be a business owner, sending Bob on a business trip, or asking Bob to equip the office with office ware. Or Alice can be a health insurance company giving vouchers-like POD money per estimated annual cost, and then sharing the savings per the actual spending.

Digital Money Utility Payment

Home and industrial utilities like power, water, gas, sewer, steam, etc. are normally metered, and paid in response to a post-usage invoice. This setup is highly inefficient, and cumbersome compared to a pay-as-you-go option where no invoice must be prepared, nor mailed, then reviewed, and not eventually paid-up, and collected. We describe here how to use the coin-splitting technique described herein to offer a real-time utility payment solution Power supply, in particular, may be a two-way configuration where consumers generated power and wish to push it to the grid. A smart pay-as-you-go solution will have to allow for this configuration.

The Utility Payment Solution

The Utility Payment Solution is comprised of a real-time payment apparatus wherein value bits are paid simultaneously with the consumption of the consumed utility. It involves a nominal consumption meter for the paid utility, integrated with a payment module and a flow-controller, together referred to as the payment-meter. The payment module is comprised of (i) real-time payment calculator, (ii) a meter interface, (iii) a digital wallet, (iv) a payment interface, and optionally: (v) payment display unit, and (vi) payment register. The Utility Payment Solution comes with two categories, modes: Non-Real Time Mint Validation and Real-Time Mint Validation. Using the Dual-String Option (DSO) for utility payments one could reduce the number of void bits to a minimum, even to zero. Namely, the entire V string will be comprised of extract-value bits. Or say, I, the interpretation string will mark s=1 and e=v. In other words all the v bits in the V string will be extract value string.

In the first category the metering and the payment is taking place by erasing or removing pre-purchased bits from the extract-value string, as it is being described in the coin-splitting section. No need for real-time payment contact with the payment center (the mint). In the latter category the meter communicates with the digital payment center to effect the payment. While the latter category offers greater security, it is also more complex, and more expensive.

In both categories, or modes, a real-time payment calculator will be determining the number of bits that must be paid for the ongoing consumption, and when the payment is stopped, the system will affect a usage controller to prevent theft of unpaid utility.

The display unit will inform the user in real time how he or she are doing—are they in the "green" or are they in the "red". Namely, are they paying right now too much, so may be the consumption can be reduced. This real time consumption rate is of particular interest for electrical power. It makes a big difference what time of the day electricity is consumed.

Non Real-Time Mint Validation Utility Payment

In this mode the consumption (flow) of a utility will be linked in real time to the destruction, burning, erasing, or removing of bits from the extract-value string, without the process of redeeming them by a real-time connection to the payment center (the mint). The key to the operation here is to insure that the burnt bits represent money and reflect either a purchase or a donation (validity).

The validity of the paid bits may be established by a combination of the following validation processes: ☐ Source Validation ☐ Identity Validation ☐ Delayed Validation Source validation is a process where the device that supplies the bits is validated, and with it the burnt bits are assumed bona fide. In the identity validation the circuitry in the payment-meter will evaluate the identity of some of the supplied bits to insure that the bits supply source is proper. The used bits may be accumulated in the payment-meter for a non-real time, delayed examination which will flush out any fraud or abuse.

The source validation is usually practiced by trusting the integrity of a bits container, a wallet, that the bits it contains are bona fide payment bits. Something in the hardware, or the features of the wallet will provide that assurance for integrity. One of the industry established "cryptographic hand shaking" protocol will be carried out to insure the validity of the source without checking or validating the bits themselves. Bit identity validation may be carried out using the concept of under-randomness in which the bits appear random but are subject to a cryptographic validation based on their identity.

The Payment Module

The Payment module involves a nominal consumption meter for the paid utility, integrated with a payment module, together referred to as the payment-meter. The payment module is comprised of ☐ real-time payment calculator ☐ a meter-interface ☐ a payment interface ☐ a digital Wallet; and optionally: ☐ payment display unit ☐ payment register.

The payment module first gets a reading from the flow meter as to the flow rate of the paid utility. The reading may be analog and in that case it is converted to digital, or it may be already in digital format. This reading and potential conversion happens in the meter interface subsystem. The reading is then transferred as input to the payment module. The payment module incorporates all the factors used by its payment formula, and translates the flow reading to payment rates.

Real-Time Payment Calculator:

The Real-Time Payment Calculator receives as input the rate of consumption of the paid utility, U* (in utility quantity units, U, divided to time unit, Δt.), and computes the rate of payment P* (bits per same unit of time Δt). This computation is based on: (i) time of payment, t, (ii) payment factors, F, (iii) and the rate formula, f:

$P^* = f(U^*, t, F)$

The payment factors may be static or dynamic. They may be locally sensed, or may be remotely communicated. Some factors may be downloaded from a central location, others may be communicated interactively from neighboring devices. The payment formula may need the detailed or integrated history of the utility flow. Time may refer to time of day, day of week, day of month, month and year. In its basic version the ratio P*/U* will be fixed and reflect how many payment bits are to be paid per a given consumption of the paid utility.

There is special consideration for power (electricity) payment. Power should cost more in peak times, and less in off hours. Power may be more expensive in days where the limit is approached, and less in calmer days. Rate may be dependent on the source of power.

Purchase of Electrical Power:

Electricity has unique features among nominal utilities: (i) it can't be readily stored, (ii) its cost of production depends on momentary demand, (iii) it supports two-way flow, (iv) it is supplied from various sources at different rates, and (v) it is subject to proactive government incentive programs. All these factors combine to a rather complex payment calculator, depending on a variety of factors.

Two-Ways Electricity Flow Payment:

Electricity can be generated locally by consumers who are also connected to consume from the grid. The locally generated power may be used in lieu of the grid supply, and at time may exceed the supply, and may engender a new back-flow from the consumer to the grid. Such back-flow is necessary because electrical power does not store well. The DSO solution will have to account for both the in-lieu mode, and the back-flow mode.

The In-Lieu Power Use:

In that case the meter-payment system will have to include a two way supply: the grid, and the local supply. It will also include a selector that would give preference to the locally generated power ahead of the grid. The locally generated power may be free of charge or charged at a different rate. The payment module will compute the payment for each source.

Back-Flow Power Use:

To accommodate this feature the payment module will include two 'cash registers' one for "spent bits" the other for "redeemed bits" also called "credit bits". As the grid supplies power, the payment bits are being consumed, but instead of erasing them or sending them off to the mint for validation, these bits will accumulate in the spent box up to a preset limit, S. This transfer of bits will follow the procedure described in the coin-splitting section. Once the limit of bit accumulation is reached, the additional spent bits will be erased or sent to mint as the case may be. If, at a given point the consumer connects with a power source (a battery, a dynamo connected to stationary bicycle, a back-yard windmill, a solar system or alike), and the power he or she supplies exceeds their consumption at the time, then the overflow is sent as power source to the grid, and the grid will pay for it, per established rates. The payment calculator will take the reading of the amount of power supplied to the grid from the consumer and apply the rate formula to compute the amount of money to be credited to the consumer. That amount, translated to bit-count will be transferred real-time from the "spent box" to the "redeemed box" or "credit box" as it is also called. When the consumer, at a later point, resume purchasing power from the grid, then he first pays with the redeemed bits that accumulated in the 'redeemed' or credited cash register. When the redeemed box has exhausted its bits, the payment resumes from the latched bit container.

This solution is based on the assumption that the reverse direction of power flow is a small fraction of the power consumed. If not then one should apply the payment procedure for nominal grid suppliers.

Digital Money Payment to Nominal Grid Suppliers:

Two solutions are presented: ☐ The non-real time connectivity solution. ☐ The real-time connectivity solution The Non-Real Time Connectivity Solution:

The solution here involves: (i) the power supplier, (ii) the power company that buys electricity from the supplier, and (iii) the Mint. The devices needed are: (a) a dedicated power-payment apparatus, (b) a digital wallet, and (c) a used-bits storage device.

The power supplier (i), connects to the grid, and the electricity flow is captured by a meter, and computed based on a variety of factors to credit in favor of the supplier. This credit is expressed as a number of bits. The meter-payment apparatus (a) will have a digital money bit holder (wallet) attached to it (b), and bits from it will flow per the computed measure to the used-bits storage device (c). However on their way from the wallet to the storage device [(a)→(b)] the bits will be encrypted with a cryptographic key that is securely embedded in the payment module.

At some arbitrary point in the process, the power supplier (i) will send the bits that accumulated in the used-bits storage device to the power company (ii). The power company will decrypt the bits sent to it, then send these bits to the mint (iii) to confirm that they are the true bits from a mint's wallet that was purchased for the purpose. This will serve as proof that those bits represent power that was supplied to the power company. Having been satisfied that it received the claimed power, the power company (ii) will then reimburse the power supplier for his power supply.

This represents a new use of the DSO option. The power supplier buys a digital money stick (wallet) for a nominal fee, say N. When these bits are proven to have been extracted from the wallet against a measured amount of electricity supplied to the grid, then the supplier claims a payment from the power company for his supplied electricity. Let this payment be P. The difference (P−N) is the net payment to the supplier. The profit for the Mint is N plus any service fee the Mint will collect from the power company, S. The power company will pay (P+S) for the power it received, but there are no additional accounting efforts.

The integrity of this scheme is based on the hardware integrity of the meter-payment apparatus. Each such apparatus will be fitted with its own crypto key (using perhaps the same cipher). As long as the crypto key is not compromised, it is impossible for the power supplier to present the spent bits to the power company without them having been first processed by the meter-payment complex. It is noteworthy that the crypto key in the meter-payment apparatus is not known to the Mint. It is only known and used by the power company.

The Real-Time Connectivity Solution:

In this mode the meter is connected to the power company. As power is being supplied, the power company sends bits to a bit receptacle prepared by the supplier to receive these bits—in a method akin to the description in the Coin-Splitting section. At any point the supplier collects the accumulating bits, sends them to the Mint for authentication, and then he or she either uses these bits for any payment they wish to make, or they ask the Mint to credit them with flat currency instead. In this solution the exchanged bits are universal. In the former solution, the exchanged bits may be dedicated for the power exchange purpose.

Assuming a wide spread deployment of cell-phone towers, and internet, one could build an IP-based payment solution. The consumers will buy payment sticks, latch them into the electronics of the solar energy contraption, and once the payment stick (wallet) is validated by the mint, it sends an activation signal to start consuming and paying for solar energy. In practice, the solar investor company may receive the coin id from the latched in digital coin, pass that data to the Mint, and when validated, the investor will send the activation signal to the solar supply. The activation will last as long that that latched digital coin has remaining bits.

A simpler, non-real-time-validation-by-the-investor solution is as follows: the meter-control electronics is linked to commensurate bit supply to facilitate payments. The identity of the bits is not real-time validated by The mint, and the integrity of the payment is maintained in other ways. Some of them are: Cryptographic Handshake and Secret identity The cryptographic handshake solution is based on wrapping the digital payment bits in a wallet, a "coin" that would have to identify itself as bona fide to the meter-payment electronic contraption at each user's site. In the simpler way there would be the same handshake for all sites, in the more advanced implementation, each site will have its own identification.

Any of the prevailing access and authentication protocols can be used to insure that the wallet that is being latched to effect the payment is a bona fide wallet, and not a false one. preferably a challenge-response protocol will be used. So, for example, using a particular cipher the payment module will include a secret key that is secured via the hardware construction of the module. This will allow the payment module to use a random plaintext as a challenge to the wallet as it is being latched in. The wallet will encrypt the plaintext using its key, and send back the ciphertext. The payment module will also encrypt the random plaintext, and compare the two ciphertexts. if they agree, then the conclusion is that the wallet has the secret key, and hence is bona fide.

In this handshake mode the identities of the payment bits are not verified per se, what is verified is that they are coming out from a bona fide payment wallet, or coin, and hence are to be trusted. These payment bits as they are being used, consumed, by the payment module, they don't go anywhere, and they are simply discarded. The payment is effected when the user is buying the wallet.

In the secret identity mode of non-real-time bit verification mode, the very identity of the payment bits only looks random, but in fact is pseudo-random, and is very carefully contrived. Using common cryptographic means one would mint as many coins as necessary. When each of these properly minted coins is served as a bit payment source then the payment module verifies its bona fide status, and allows for the payment to proceed. If the test fails, namely the identities of the payment bits are not passing the crypto test, then the payment is stopped, and the power supply is shut down.

A Meter Interface:

The meter interface (i) reads the utility consumption rate from the meter, (ii) it communicates with the other components of the payment module, and (iii) it sends a "GO/No-GO" signal to the flow-control module indicating whether the utility is allowed to flow normally, to flow under constraints, or to stop altogether.

A Digital Mint (Payment) Interface:

The payment interface receives the real time bit payment needed to pay for the real-time consumption of the paid utility. The input is the number of bits needed to effect the payment. These bits are extracted by this interface from the Digital payment wallet—the coin—the Digital payment stick that houses the payment bits to be paid. Following their extraction from the wallet three options are possible depending on the implementation scheme: erasure, dispatching to a dedicated spent bits container, communicating the bits for real-time payment validation.

Erasing the bits is the simplest operation. The bits are then irretrievable. Dispatching to a dedicated spent bits container may be used in two options: for delayed validation and for payment reversal Payment of utility may be implemented with a delayed validation of the spent bits. It may be too burdensome to real time validate the bits, and in that case one would take the spent bits every so often to a communication station, and validate the bit identity after its use. If there is a problem then per policy, an invoice will be sent, or the service will be cut off, equipment removed, etc.

We have seen that in case of electrical power, the user might have an occasion to sell the power company some electricity generated by him or her. In that case the user, or consumer will earn credit, and that would be in the form of pulling bits out of the spent bits box and deposing them in a dedicated credit bits or redeemed bits box, from where the bits will be paid "again" when the consumer returns to buy power from the power company.

In real time applications, the payment interface will send the bits, through IP for The mint to validate them real time. All these functions are covered by the payment interface.

A Payment Wallet:

The wallet may be generic and simple for the case when the bits are real-time validated by The mint, or it may be at various levels of protection and sophistication if no such real time validation takes place. The risk for the non-real time validation is the replacement of a payment wallet by any random string of bits that are being extracted and disposed as if they were payment bits. To prevent this without real time validation or subsequent validation it is necessary for the wallet to project hardware integrity. The wallet will have to be constructed with features that would be required by the payment interface, and that without them the payment will not be carried out. These features should be difficult to emulate either on account of technological difficulty or on account of secrecy, or perhaps a combination.

Of particular interest may be the under-random digital coin in which the identity of the bits is not fully random, only under-random, namely the bits appear random to a viewer yet their construction is such that the payment interface will be able to distinguish between a bona fide Digitally minted coin, ("wallet"), and a look-alike. As explained here, the system offers a cryptographic assurance for the integrity of the paid bits.

Payment Display Unit:

This unit is optional. It is designed to offer the user real time display of his use of the paid utility. The display may be an audio signal or a visual, or perhaps both.

Audio Usage Display

The idea here is to alert the user that the utility he so dearly pays for, is now rising in its consumption, and so perhaps it will make sense to shut some systems off. The signal may be a shrieking noise, or it may be a period alarming signal depending on the degree of consumption, or on the degree of attention required.

Visual Display:

The visual display may range from a threesome dot light: green, yellow, red indicating increasing level of consumption. It may be a colored graph, it may be a detailed table, or perhaps a combination of some of the above.

A numeric display might show rate of use at the moment, integrated use from a given reference point (early this day, this week, this month), and comparable or average figures.

In a more sophisticated version the payment unit may be fed from downstream consumption data (from downstream meters), and accordingly display advice to the user what is best to shut down.

Payment Register:

The Payment Register complement the working registers of bit-boxes that are part of the payment unit. It may be used as an easy latch-on, latch-off for new and old bits. The removed bits may be sent to The mint for delayed validation.

Utility Flow Controller

The utility flow controller is a component that controls the flow of the paid utility. In its basic form it is simply a go/no-go device. If the consumed utility is properly paid for, its status is a 'go', if no payment was made (no bits available for payment), then the payment module unleashes a "No-GO!" signal, and the utility flow stops. It kicks back in the moment that fresh authorized Minted bits are available to the system.

The flow controller may have built in sophistication in the form of: delayed flow stop; rate of flow ceiling; or conditional flow.

The "delayed flow stop" action is simply a grace period, counted from the moment that no payment bits are available. The grace period may be indicated by an audible signal or other means to alert the user that his power, water, gas, etc. is about to be stopped.

The rate of flow ceiling is a mechanism whereby the controller allows only a preset consumption rate designed to prevent normal usage (until payment is made), yet, without imposing a total cut-off, which might have serious consequences to the unsaying user. So, for example, the power supply will be limited to support a refrigerator and some light bulbs, but not the air-conditioning system, nor the dish-washer, etc.

Conditional flow may refer to time of day, date, demand by neighbors, or any other logical term designed to affect a distinction between well paid utility and unpaid utility. Any combination of all three options is also possible.

Various embodiments include a method to pay for utility consumption on a real-time basis by splitting digital coins at a rate that pays exactly for the utility measure being consumed; the digital coin being latched into a utility usage device equipped with a computing apparatus that matches the consumption of value bits from the latched digital coin to the real time consumption of the utility; the utility flow is stopped when no more payment bits are available.

In various embodiments of this method the split off (paid) value bits are erased, and the utility company is paid when the digital coin is purchased.

In various embodiments of this method the split off (paid) value bits are accumulated in a receiving coin (bit container), and from where they are being returned to the original latched coin, in the event where the utility consumer generates a measure of the utility, which is being sold back to the utility company, as is common with electrical power.

In various embodiments of this method the paying coin is in a form of a tamper-resistant hardware, and a validating cryptographic protocol is used to verify the paying coin as bona-fide.

In various embodiments of this method the paid bits are sent to the utility company which eventually redeems them with the mint.

Erosive Intractability Immunized (EII) Cryptographic Money

We introduce here the apparently novel concept that cryptographic money must be immunized against the threat of erosive intractability. Practically all cryptographic primitives and cryptographic ciphers today are threatened by erosive intractability—meaning: they are based on assumed—not proven—intractability that is continuously eroding as more relevant mathematical insight is being gained, and faster computers come to the fore. The rate of intractability erosion is unpredictable, and hence any cipher, or cryptographic scheme that is based on erosive intractability is not suitable as a basis for cryptographic money, (also regarded as digital money, digital coins, or digital currency). The basis for a durable and hence acceptable currency must be a cryptographic procedure that is immunized from erosive intractability.

Key-Indefinite Cryptographic Money:

Let M be a digital money generating algorithm. Let the Mint be the authority that generates, issues, mints the tradable digital coins under some acceptable trading environment. Let there be a binary string K, of length k bits known as "the Key". The Mint applies K via M to mint coins. Let the Mint generate some n coins $C_1, C_2, \ldots C_n$ which circulate among the participating traders. Let M either be a-priori public (in order to convince the traders that the digital money mint is robust), or let M be an initial secret which eventually leaks to the public knowledge. If M is a regular, definite algorithm then a fraudster, aware of M may apply the "brute force" approach and try all $2^k$ possible keys until he mints an exact image of a bona-fide coin, and passes it as a traded value, thereby breaking the system. In an indefinite cryptographic setup M will be such that in order to mint a cryptographic coin, one would use a key of indefinite size, namely, the key, K, comprised of k bits such that k=1, 2, . . . infinity, and hence it will be impossible for a fraudster to apply any means to exhaustively check a finite number of possibilities and mint an image of a bona-fide coin.

Using U.S. Pat. No. 6,823,068 as an Indefinite Cryptographic Money Scheme: U.S. Pat. No. 6,823,068 teaches us how to encrypt any size plaintext using any size key. Accordingly one would use said patent to mint cryptographic money. In particular one could increase the size of the key at will and thereby correspondingly increase the burden on the fraudster trying to mint an image of a bona-fide coin.

Feedback Indefinite Cryptographic Money

Let P represent the plaintext version of a digital coin, and C represent the corresponding ciphertext of P. Let the cryptographic money scheme be based on distributing C, and validating it by converting it into P. A feedback indefinite cryptographic money will be money that when its C version is being used as a source to devise its corresponding P version then by exhaustively analyzing C one harvests p different plaintext candidates: $P_1, P_2, \ldots P_p$ such that all p options are plausible. The larger the size of p, the greater the terminal undecidability of the plaintext version of the coin. And since the p options are derived from an exhaustive analysis of C, no further mathematical insight, nor faster computers will reduce the field of p plaintext options for the coin, and the larger the value of p, the greater the security of the scheme.

Randomized Value Coins:

EII cryptographic money may be based on a randomized value string. Let R be a randomized string of size r bits. The attribute 'randomized' indicates that the identity of the bits that express the value of the coin are determined by a true random process, as may be developed by logging the behavior of a radioactive decay of a radioactive source, in the standard fashion of counting the decay events, and, for example, recording as one if the number of decay events (atomic disintegration) over a set period, say 10 nanoseconds are above average and recording zero if the number of decay events is below average. Other true randomization sources will do too, and for less exacting implementations, a pseudo-random process will do too. If R, which, as indicated, is truly randomized, and it fully carries the value of the string then any encrypted result of R cannot be cryptanalyzed even by brute force approach because almost every key in the key space that is being used, yields a randomized looking string, so the cryptanalyst will distinguish no distinction between the string that represents the value of the coin, and most of the other $2^r-1$ strings, which are random-looking. This case will qualify as feedback indefinite cryptographic money.

A Case for Randomized Value Coins:

Dual String Option (DSO)

One builds a digital coin comprised of five concatenated strings: (i) the coin identity-string, (ii) the coin value string, (iii) the coin interpretation string, (iv) the coin attributes string, and (v) coin cryptographic parameters. The coin-identity string will comprise characters that will identify each coin through a unique identifier. This unique identifier, Id, will be used to establish an easily searchable database of the coins, and otherwise reference it as needed. The coin value string, V, is comprised of v perfectly randomized bits. Namely the value of each bit, one or zero, is determined without any preset rule or formerly established order, and independent of the bit identity of all other bits in the string. Consequently, all $2^v$ possible strings of size v bits could pass as the value string, and a cryptanalyst will have no grounds to rank these $2^v$ strings by any order of probability. The coin interpretation string, I, will carry the data needed to extract the value of the coin from the value string V. The idea being to express the coin via two strings: one a pattern based screen (I), and one perfectly random string (V), where the random string will insure the undecidability that will qualify such a minted coin as feedback-indefinite cryptographic money. This dual-string options will be implemented in various ways. 1 I-V separation method 2. I-V mix method I-V Separation Method: In this implementation the value of the coin per se is determined by the interpretation string I, and V is used for validation of holding or being aware of the coin. String I is comprised at the very least two parameters, (1) scale, and (2) end-points.

The scale is a measure of how many dollars correspond to a bit–d. The end points indicate the starting bit (by count from the beginning of V), s, and the ending bit, e, also counted from the beginning of V. The value of the coin will be determined by the following formula:

$$\{\text{dollar value of the coin}\}=d^*(e-s+1)$$

The bits in the string from bit s to bit e, are the hidden value bits of the coin. The bits 1 to s−1 and e+1 to bit v, serve purely for distraction and confusion of fraudsters.

Example: the value string V of a coin is given as: 1001100110011001011110

It's length v=22. V may be coupled with an interpretation string I that indicates: d=0.1$/bit, and s=4 and e=12. The value of this coin is given by: {coin value}=0.1(12−4+1) =$0.90. The identify of this $0.90 coin is given by the substring of V From s to e: 110011001

I-V Mixed Method: In this implementation the value of the coin is determined jointly by strings V and I. The I string specifies the starting bit s (in string V) and the ending string e, (in string V), such that bits 1 to (s−1) are meaningless, and the same with respect to bits (e+1) to v. The interpretation string I also indicates d—the $/bit basic ratio, but it also indicates m—where m is the number of bits, beginning with s and continuing with s+1, s+2, . . . until s+m−1, such that the numeric value of these m bits represents a multiplier to multiply the basic $/bit ratio with in order to get the applicable $/bit ratio of the string that begins with bit s+m, and ends with bit e.

{coin value}={value of the *m* bits multiplier string}*d**(e−s+1−m)

For example, the above illustrated 22 bits V string with a corresponding I string specifying: s=4, e=12 and d=$0.10 will also specify m=3. Accordingly the multiplier string: bits s, s+1, s+2 will be read from string V to be: "110" which is the binary expression for the decimal number 6, and hence: {value of coin}=6*0.10*(12−4+1−3)=$3.60

In the mixed I-V implementation neither the I string alone, nor the V string alone determine the value of the coin, but both together do. In the I-V separated implementation the I string determines the value of the coin, and the V string provides its identity.

The coin-attributes string will contain various attributes of the coin. For example, the attributes will dictate time (date) when the coin becomes valid for trade, and a later date when the coin expires, and becomes valueless. The attributes might designate the allowed redeemer—the person, or the group of people, who are designated as bona-fide agents to redeem the digital coin against other forms of money. Similarly, the attributes will specify any logical condition required to be fulfilled in order to redeem the coin.

The coin cryptographic parameters will be keys and data needed to execute cryptographic protocols. For example, the coin identification string, the coin interpretation string, and the coin attributes string may be signed by the mint using its private key in an asymmetric encryption. The cryptographic parameter will contain the signature, which will be interpreted by a trader using the mint's corresponding public key, and comparing the signature to the expected signature from these strings as they appear in the coin. This is a standard way to ascertain the bona fide integrity of the strings of the coin. This minting procedure allows for digital coins to be of same bit size (bit count) regardless of value. This attribute is very important for database operations regarding the coins.

Double-Bitting:

In some applications it may be helpful for the mint to convey partial coin information to its agent, so that the agent will have sufficient coin information to independently authenticate a coin and authorize its redemption, but will not have enough information to claim the coin for redemption at the mint. This might be accomplished by randomly selecting some bits within the extract-value substring of the value string V, and masking the identities of these bits. In order to express coins with some of the coin bits written with hidden identity one could use two consecutive bits to express a single bit. The following mapping may be used. To express a bit with identity "0" one would use two consecutive bits written as "01". To express a bit with identity "1" one would use two consecutive bits written as "10". To express a bit with masked identity, one would use two consecutive bits written as "00". The remaining combination: "11" will be used to indicate a start and end of a string. Using this scheme one could mask the identity of any bit in a string at a cost of doubling the size of the strings.

FIG. 3 depicts the structure of Dual String Option digital coin, in accordance with various embodiments. In part (a), FIG. 3 shows the structure of the digital coin where N represents the identification (name, number) of the coin, A represents the coin attributes string, V represents the coin value string, I represents the coin interpretation string, and C represents the string that contains cryptographic parameters. The coin value string, V is comprised of pseudo random bits and perfectly random bits. The coin interpretation string I contains the following parameters: d—the $/bit factor, s—the bit count in V where the extract value string starts, e—the bit count in V where the extract value string ends. The figure features the formula used to determine the value of the coin. The identity of the coin is carried by the identities of the bits s, s+1, s+2, . . . e (the extract value string). The identities of all other bits in V (namely: 1, 2, . . . (s−1), (e+1), (e+2), . . . v) are inconsequential. Each coin holder can replace them with his or her own set of pseudo-random identities. Albeit, to redeem the coin, the redeemer will have to know the exact identities of the extract-value string: bits s, s+1, . . . e. The underlying idea here is that the coin is expressed per identity and value by two strings: I and V, where V is a randomized string that successfully resists any attempt to discern a pattern therein. While it is best to build the extract-value string (bits s to e) from perfectly randomized bits (like measuring radioactive decay), one could implement the method using pseudo-random bits for these extract value strings.

In part (b), FIG. 3 shows how the V string can contain any number of extract-value sub strings. The starting bit and ending bit in V of each such extract value string (or say, equivalently: substring) is identified in I, the coin interpretation string, which also identifies the $/bit value for each extract-value substring. The value of the coin is the sum values of all the extract-value substrings that comprise it. In the drawing three such extract value substrings are shown. One could use this multiple extract value string configuration to build a coin from various size sums so that one could use the coin splitting method, and split off cents, or parts of a cent, split off dollars, hundreds of dollars, thousands of dollars, or any other resolution, where each extract value string corresponds to one such resolution by its specified $/bit d value. One would make sure that for each string the value of (e−s) is sufficiently large to insure overwhelming odds against a wild guess of the coin identity.

The Foremint

The mint minted digital coins may be passed to another entity that would add information to the coin before releasing it for trading. That entity may be called a foremint. The foremint will add 'foremint strings' that will include foremint added identification string ($fm_{id}$), and foremint added attributes string. This will allow the foremint to add information to the digital coins minted by the mint (also known as the core mint). The foremint will pass to the traders the coin with the core mint's string and the foremint's string. The foremint may use its own public/private keys to sign its add-on strings, and insure their identity. A coin processed by a foremint will have a proper indication for such an add-on, written in the attribute string, or special parameters string by the first mint (the core mint). If the foremint adds conditions for redemption of the coin, then the core mint will not redeem this coin without those conditions being met. The foremint may decide to redeem a coin by its trader, then redeem that coin at the core mint, as the case may be.

Multiple Extract-Value Strings

The value string V is comprised of bits that identify the coin by their value pattern—these bits comprise the 'extract value string', and all the other strings that are present in order to deny coin fraudsters their fraudulent goal. These other bits are to be referred to as 'void bits'. As described above the value string V is comprised of an extract value string spanning between bit number s to bit number e, and from void bits: bits 1 to (s−1), and bit (e+1) to bit v.

The concept described above where the V string features one single extract value string may be extended to multiple value strings that are positioned at various spots in the V string. Each extract value string will have corresponding data in the corresponding coin interpretation string, I, and each extract value string will have a corresponding dollar value. The dollar value of the coin will be the sum of the dollar values spread across the V string.

For example: let V be the following 42 bits string:
V=100100111000011110101010001111101100010110

The corresponding interpretation string I will feature three extract value strings: Extract value string 1: d=$2.50/bit m=2, s=3, e=11. Extract value string 2: d=$10.00/bit m=3, s=13, e=22. Extract value string 3: d=$0.10/bit m=4, s=30, e=40. Examining V, one concludes:
Extract value string 1 is: 010011100 and since m=2 the conversion multiplier M=1 and the dollar value of this extract value string (value substring)=2.50*1*(11−3+1−2) =$17.50
Extract value string 2 is: 0111101010 and since m=3 the conversion multiplier M=3 and the dollar value of this extract value string (value substring)=10.00*3*(22−13+1−3)=$210.00
Extract value string 3 is: 11011000101 and since m=4 the conversion multiplier M=13 and the dollar value of this extract value string (value substring)=0.10*13*(40−30+1−4)=$9.10

And the value of coin is the summation of the values of the substrings: $17.50+$210.00+$9.10=$236.60

Encryption

The essential feature of this digital money is that the mint uses perfect randomness to build the extract-value strings. Such are radioactive decay, which is considered perfectly random. In that sense this may be regarded as quantum physics based coin minting. The void bits may be determined using a pseudo-random process. The extract-value strings and the void bits will form a random looking string, V, that is likely to satisfy all the prevailing standard of randomness. Hence, using any nominal encryption over the value string will result in another random-looking (pseudo-random) string. So the encryption will convert a pseudo-random string to another pseudo-random string. This will deny the cryptanalyst the ability to apply "brute force" to break the encryption because every tried key will yield a bona fide pseudo-random bit sequence, and there would be no positive feedback to indicate if a used key is the right key or not.

A cryptanalyst might try to break the encryption by eavesdropping on the coin passed from the mint to its first trader, and thereby catching the ciphertext of the value string. Then the cryptanalyst will sell some merchandise to the recipient of the coin, and will receive the coin as payment—this will give the cryptanalyst the plaintext of the coin. Now given the plaintext and the ciphertext, the cryptanalyst will regain the power of brute force approach (or accelerated brute force).

There are several remedies to this threat: (1) the large key remedy, (2) one-to-many encryption option, and (3) re-voiding.

The Large-Key Remedy:

By employing a sufficiently large key one reduces the threat of brute force discovery of the trader's key. The size of the value string V may be standardized, say to 10,000 bits or, say 100,000 bits, and then one could proportionally extend any given block cipher, like DES or AES and apply it to the standardized size of V, by using a proportionally large key. The typical block cipher creates a very good mix of all the block input bits. In this case this will generate a good mix of the void bits and extract value strings. One might device a dedicated cipher, using the ideas in DES and AES, featuring transposition cycles of the entire V string, (the block), and corresponding substitution boxes, where the key may be of any size and from which v-bits size keys can be extracted to effect exclusive-OR bit by bit operation over any transposed or substituted version of the original v-bits size value string V. Like in DES or AES, several cycles may be used. The underlying idea being to achieve a good mix of the v-bits of the V string, such that the void-bits and the extract-value coin bits will form a randomized combination resisting cryptanalysis.

One-to-Many Encryption:

A one-to-many encryption where the size of the ciphertext is considerably larger than the size of the plaintext will allow for a random selection to determine the choice ciphertext that will encrypt back to the plaintext. Accordingly the cryptanalyst holding both a single ciphertext and the plaintext might analyze the situation exhaustively and find many encryption keys that would lead from same plaintext to same ciphertext, resulting in residual entropy and not sufficient data to determine which of the possible keys is the one actually used. And since both plaintext and ciphertext are bona fide pseudo-random strings, there is no feedback to guide the cryptanalyst.

Use of U.S. Pat. No. 6,823,068 for One-to-Many Encryption:

U.S. Pat. No. 6,823,068 is a one to many encryption where the key may be designed to create a much larger ciphertext size string than a plaintext size string. This will allow for a large spectrum of possible keys to be used for converting the plaintext to the ciphertext.

Re-Voiding:

The idea here is that each recipient of the coin will re-populate the void bits with some pseudo-random number generator, before encrypting the value string with the key of the next recipient of the coin. This will further frustrate the cryptanalyst and will deny him the ability to hold a matching pair of plaintext and ciphertext. The ciphertext which the cryptanalyst will catch from the transfer of the mint to the first trader will correspond to a different plaintext from the one he will be getting from that first trader because the first trader will re-populate the void bits.

In order to a redeem a digital coin, the redeemer will have to prove to the coin redeeming agency that she has the exact identities of all the bits in the one or multiple extract-value substrings within, V, the value string of the coin. Partial knowledge of some of the bits is not sufficient. And because the identities of those bits is perfectly (or near perfectly) random, then for sufficiently large number of such bits the chances of defrauding the system by guessing or inferring the identities of those bits are exceedingly negligible. The mint decides how many bits are needed to express a given value, and it can decide to use a large number of bits for large sums of money.

Coin Splitting

Using the EII digital coins a first user (Alice) could transact with a second user (Bob) in a continuous payment mode with very low, or very high payment rate per event or per unit of time. Let Alice be in possession of a $10.00 coin comprised of 10,000 bits value string, V. Within V there is a single extract-value string that is 1000 bits long, stretching from, say bit s=1201 to bit e=2200. Let the effective $/bit conversion rate be $0.01/bit. Suppose now that Alice wishes to pay Bob at a rate of two cents per minute for some continuing service Bob provides her. To do that Alice will first pass to Bob her coin at zero value. This would be the same coin as hers, using the same identity, and the same payment attributes. Its value string V will be also 10,000 bits long, only that Alice will send Bob 10,000 pseudo-random bits, and the interpretation string I will be say s=2201, and e=2200. Accordingly the coin owned by Bob will be worth $0.00. Bob will be able to confirm with the mint that Alice's coin appears valid and not redeemed. Now as the payment period starts, then after 1 minute Alice owes Bob 1 US cent. She will then pass to Bob the identity of bit number 2200, and decrement the e value in its coin from 2200 to 2199. Bob will place the bit identity given to him by Alice in his value string, into bit number 2200, and will set his s value to 2200. These actions will cause Alice's coin to lose 1 cent in value because Alice's extract-value string now spreads from s=1201 to e=2199, which corresponds to the length of the extract-value string of e−s+1=2199−1201+1=999, with a corresponding value of $9.99 given the $/bit conversion rate of $0.01/bit. So by passing the identity of the single bit from her coin to Bob's, and by decrementing the value of the e bit from 2200 to 2199, Alice has adjusted her coin to rate at one cent less than $10.00. At the same time Bob's value interpretation string shows an extract-value string of e−s+1=2200−2200+1=1, and per the same $/bit conversion, Bob's coin will rate at $0.01. So the net effect was a split of the original Alice coin to two coins where Alice coin is worth $9.99 and Bob's coin is worth $0.01—together they are worth the $10.00 which Alice's coin was worth before this transaction setting. When another minute passes, the electronic circuitry between Alice and Bob passes the identity of the next bit from Alice to Bob. Alice, then decrement its e setting from e=2199 to e=2198, and its extract-value string is now: e−s+1=2198−1201+1=998 bits long, which is valued a $9.98 (one cent less than a minute ago). Bob receives the identity of the bit sent to him by Alice, and places this bit at position s=2199. His extract-value string is e−s+1=2200−2199+1=2 bits long, which corresponds to a value of $0.02. Again the sum values of Alice's string and Bob's string is $10.00, but Alice's string decrements its value 1 cent/minute, and Bob's string increments its value 1 cent/minute. If Bob's service to Alice lasts 20 minutes, then after 20 minutes Alice stops the flow of bit, and by then she has marked her e value to be e=2200−200=2000, and her extract-value string is: e−s+1=2000−1201+1=800 bits, or $8.00 of value, while Bob's value string shows s=2001, and it comprises: e−s+1=2200−2001+1=200 bits or $2.00. At any point during the continuous payment transaction that lasts 20 minutes, Bob could contact the mint with the identities of the bits that Alice sent him, and validate with the mint that the bits are properly identified, and the payment is bona fide. Alice, if she later on sends the $8.00 coin to, say, Carla, will first re-void the bits from 1 to 1200 and from 2001 to 10,000—meaning she will populate those bits with pseudo-random values. So will Bob do when he pays his $2.00 coin further.

The described digital coins minting procedure allows for coins to be of fixed size regardless of value, but at the same time it allows for coin splitting at any desired resolution without having to negotiate with the mint each time around. Splitting will happen by passing coin bits between payer and payee at the agreed upon rate.

Expiring Digital Coins

The expiring digital coins program (EDC) works as follows: a group of n asset holders, player, may wish to play-trade with their assets. They will choose an EDC operator who would mint digital coins with a set expiration date Te+r, where Te is a set time point, and r is an extension of Te, and it has a value that will be determined at time point Te. The group puts in play n assets: $A_1, A_2, \ldots A_n$, and each player receives EDC coins in the amount corresponding to the value of the asset he or she put into play. Once done, the 'trade-game' proceeds in a series of 'rounds'. The rounds are punctuated in time, for example one round per hour, or one round per day. So that the expiration time point Te corresponds to a set number of rounds. Before the trade begins each player owns the asset he or she put into play. A first 'round' is announced by the EDC operator. In a round each player bids any amount of his choice from the EDC coins he holds, on any of the n assets. A player can distribute his EDC coins among several assets or concentrate his or her bidding on one asset. The bidding is secret. Each player informs the EDC operator by the deadline for the round, as to his biddings. When the bidding is done the EDC operator examines the bids, and assigns each asset to the highest bidder for that asset. If an asset has received two or more highest bids then the asset remains in the hands of its current owner. The winning bidder pays the expiring coins to the owner of the assets, and in turn receives ownership of same asset A winner of an asset must keep the asset in the bidding, as long as the rounds continue, but he or she may bid on the asset they own, and win it again, if their bid is the highest. By the round that corresponds to time point Te, a random process of some sort determines the values of r from a preset of possible values, say, 0 to 6—allowing for no more rounds, or up to six rounds. When the rounds are done (at time point Te+r), the bidding money "vaporizes", expires. All the assets remain in the hands of those who won them last. So the net result is that the playing money disappears, but ownership of the n assets has been shuffled around. Those who anticipated well what the others will do, and played with a good strategy won.

A sensitive question is how to determine the values of the asset each player brings to the trade-game. This determination is done via consensus. The owner of an asset suggests X as the value of the asset. If all the other players agree, the owner puts this asset to play and receives $X expiring dollars. If one or more of the others disagree then they propose a lower sum $Y. If the owner agrees to the counter proposal, then $Y is the value of his assets, and he receives $Y expiring dollars. The owner and the others may propose and counter propose until they agree on a sum $Z, and that is the amount of expiring dollars he receives, or until they decide that they can't reach a consensus, and that owner does not join the trade-game. The reason for each asset owner to receive expiring dollar in proportion to the estimated value of his asset is that he or she puts at risk their asset.

The EDC trade-game creates activity with the use of expiring money. It shuffles assets among traders using dedicated, expired money.

Additional rules: 1. bidders cannot pool their money to outbid the others. Each player can bid only his or her own money. 2. The expired money is not tradable outside the trade-game itself, 3. All players know how much expiring money the other have, but they know not what each bids.

The detailed description of the present invention is presented largely in terms of procedures, steps, logic blocks, processing, or other symbolic representations that directly or indirectly resemble the operations of devices or systems that produce the effect. These descriptions and representations are typically used by those skilled in the art to most effectively convey the substance of their work to others skilled in the art.

Reference herein to "one embodiment," "various embodiments," or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Further, the order of blocks in process flowcharts or diagrams or the use of sequence numbers representing one or more embodiments of the invention do not inherently indicate any particular order nor imply any limitations in the invention. Referring now to the drawings, in which like numerals refer to like parts throughout the several views.

What is claimed is:

1. A system comprising:
a mint comprising a processor and memory storing instructions that, when executed by the processor, causes the processor to generate digital coins and serve as a coin redeeming authority (CRA);
a first and second trader computing device each programmed to trade the digital coins;
wherein the mint passes the digital coins to the first trader device and wherein the first trader device passes the digital coins to the second trader device until at least one of the first and second trader devices redeems the digital coin at the CRA;
each digital coin of said digital coins comprising:
a value bit string V concatenated to meta-data bit strings;
wherein the value bit string represents the value of the digital coin and is comprised of v bits where the value of each bit $\{0,1\}$ is randomly determined;
wherein the meta data bit strings comprise a coin interpretation string, I, a coin attributes string, and a coin cryptographic parameters string, and where coin attributes are coin identification parameters, terms of payment parameters, and special case parameters;
wherein the coin interpretation string, I, features a first set of attributes regarding a first subsection of the value bit string: scale, $d_1$, that expresses a monetary value of a single bit in the first subsection, and subsection end points, $s_1$ and $e_1$, where $s_1$, marks a starting bit, in the first subsection, where $1 \leq s_1 \leq v$, and where $e_1$ marks the end bit, in the bit count where: $s_1 \leq e_1 \leq v$;
wherein, in the case where $v - e_1 > 1$ the coin interpretation string, I, features a second set of attributes regarding a second subsection of the value bit string: scale, $d_2$ that expresses a monetary value of a single bit in the second subsection, and end points, $s_2$ and $e_2$, where $s_2$, marks the starting bit in the second subsection where $e_1 < s_2 \leq v$ and where $e_2$ marks the end bit of the second subsection where $s_2 \leq e_2 \leq v$;
wherein, in the case where $v - e_2 > 1$ the interpretation string, I, features additional sets of attributes regarding additional subsections of the value bit string, up to a total count of u subsections and u sets of attributes: 1, 2, . . . u where for t=1, 2, . . . u the set is comprised: scale, $d_t$, and end points, $s_t$ and $e_t$, where $s_t$, marks the starting bit in the $t^{th}$ subsection, and where $v - e_{t-1} > 1$ and also where $e_{t-1} < s_t \leq v$ and where $e_t$ marks the end bit in the $t^{th}$ subsection and where $s_t \leq e_t \leq v$;
wherein, the value of the digital coin is computed as:

$$V_{coin} = \Sigma d_t * (e_t - s_t + 1) \ldots \text{ for } t=1,2, \ldots u;$$

wherein the terms of payment parameters include, but are not limited to expiration date, redemption validity date, product or service: specific product or type that must be purchased by that coin, and any other logical term;
wherein the terms of payment parameters put the digital coin in a 'tethered state' in which the money referred to by the terms of payment parameters cannot be used as freely as regular money, but rather in a particular limited way, as specified by the terms of payment parameters;
wherein the cryptographic parameters include standard means to insure integrity of the coin;
wherein the cryptographic parameters are keys and data needed to execute cryptographic protocols and include: the coin identification string, the coin interpretation string, and the coin attributes string will be signed by the mint using its private key in an asymmetric encryption; the cryptographic parameters will contain the signature, which will be interpreted by a trader using the mint's corresponding public key, and comparing the signature to the expected signature from these strings as they appear in the coin;
wherein the at least one trader computing device holding a digital coin of value $V_{coin}$ will pay an amount $V_{split} < V_{coin}$ by constructing a split coin as follows:
copying, by the at least one trader computing device, the meta data of the digital coin to the split coin, the value bit string in the split digital coin will be comprised of identities of p consecutive bits in the value bit string in the digital coin such that:
$v_{split} = d_i * p$ where $d_i$ is the scale of the p consecutive bits in the value bit string of the digital coin;
writing, by the at least one trader computing device, the location of the p bits string in the value bit string of the digital coin onto the split coin;
checking, by a recipient trader computing device to whom the split coin is transferred, if the split coin is valid in accordance with the information encoded in the terms of payment string in the meta data; and
applying, by the recipient trader computing device, the cryptographic parameters in the cryptographic parameters string to validate the authenticity of the received split coin.

2. The system in claim 1, wherein the minted digital coins are redeemable only by a CRA that operates on behalf of a particular store or a coalition of stores such that if given out for free, the digital coins represent a means for the store to extend discount to its customers, and to turn prospective customers to customers.

3. The system of claim 1, wherein each bit of the value bit string is represented by two bits as follows: "0"-→"01", "1"-→"10", and where a bit in the value bit string with no identity assigned will be written as "00", while the combination "11" will be used to signify the start and the finish of the value bit string;
wherein the trader computing device is further configured to effect a continuous payment to a recipient trader computing device, by passing first the meta data of the paying digital coin, and then at a later time passing the identities of bits in the value bit string of the paying digital coin to the recipient trader computing device digital coin and simultaneously change the designation of these bits in the paying digital coin from either "01", or "10" to "00", to avoid double payment.

4. The system of claim 1, wherein the processor mints a digital coin at time Tm on behalf of a first trader computing device, without this trader paying for the digital coin, this coin is further traded to a second trader computing device, who at a later time Tr>Tm submits it, or a split thereto, to the CRA to be redeemed;

upon a request for redemption, the CRA demands payment of the redeemed value from the first trader computing device, the first trader computing device checks that all the terms of redemption specified in the redeemed coin have been fulfilled, and if so the first trader computing device pays the value of the redeemed coin to the CRA, and the CRA pays the second trader computing device the value of the redeemed digital coin;

wherein this system operates as an extension of credit from the first trader computing device to the second trader computing device.

* * * * *